Patented Aug. 4, 1953

2,647,927

UNITED STATES PATENT OFFICE 2,647,927

NONCORROSIVE CHOLINE CHLORIDE COMPOSITION

Fred W. Schmitz, Terre Haute, Ind., assignor to Commercial Solvents Corporation, Terre Haute, Ind., a corporation of Maryland No Drawing. Application May 26, 1951,
Serial No. 228,529

7 Claims. (Cl. 260—567.6)

This invention relates to choline chloride and more particularly to non-corrosive choline chloride compositions.

Choline is a vitamin of the B-complex series and it is an important factor in nutrition, being indispensable in the performance of many body functions. The material is used commercially by feed manufacturers as a supplement in feeds for farm animals especially poultry and swine. It is generally marketed to such manufacturers in the form of its more stable salt, choline chloride. Pure crystalline choline chloride is very hygroscopic and difficult to handle and distribute uniformly through a feed mix so the material is preferably marketed in aqueous solution. However, to market choline chloride in this form brings on a very difficult corrosion problem, choline chloride being corrosive to steel. Thus shipment must be made in plastic lined drums and the material must be stored in glass lined tanks or excessive corrosion of the containers takes place and the choline chloride solution becomes discolored due to the formation of iron precipitates.

The object of the present invention is to provide an aqueous solution of choline chloride which is non-corrosive to steel.

I have now discovered a choline chloride composition which is non-corrosive to steel, thus making it feasible to ship and store aqueous choline chloride solutions in ordinary tank cars and in ordinary steel tanks.

My invention consists of a non-corrosive choline chloride composition which comprises aqueous choline chloride containing a compound selected from the group consisting of alkali metal hexametaphosphates, tetraalkali metal pyrophosphates, alkali metal phytates and alkali metal tripolyphosphates and a compound selected from the group consisting of tartaric acid and citric acid, the pH of the composition being adjusted within limits described below.

Due to the fact that when tartaric or citric acids are used in aqueous choline chloride solutions without the phosphate the overall corrosion rate is actually accelerated, it is entirely unexpected that my new composition would prevent corrosion of metal by choline chloride for extended periods of time. Also when the phosphate compounds are used alone, local type corrosion, commonly called pitting, is accelerated. However, my new composition prevents both types of corrosion and, in addition, the material of my invention has excellent sequestering properties which can be defined as the ability to keep iron in solution in concentrations which would otherwise precipitate as the hydroxide or oxide. This is an important property due to the fact that a slight amount of iron is continuously going into solution (corrosion) in the choline chloride composition, and if the material did not have a sequestering effect the iron would soon become visible through the appearance of a green turbidity brought about by precipitation of hydrated iron hydroxides which green turbidity would change to a red discoloration as oxidation took place and iron oxides were formed.

The material of my invention is prepared by dissolving in an aqueous solution of choline chloride, a minor portion of a compound selected from the group consisting of alkali metal hexametaphosphates, tetraalkali metal pyrophosphates, alkali metal phytates (inositol hexaphosphate) and alkali metal tripolyphosphates, then adding to the solution a small portion of a compound selected from the group consisting of tartaric acid and citric acid and finally regulating the pH of the solution by adding an alkali metal hydroxide.

As has been indicated above my invention applies to aqueous solutions of choline chloride and especially to commercial preparations of aqueous choline chloride which are generally of a concentration of about 70%. My invention is applicable however, in aqueous solutions of choline chloride having a concentration as low as approximately 50% but in concentrations below about 50% there is a sharp drop in the effectiveness of the corrosion inhibitors which I employ.

The amount of phosphate which I employ in preparing the composition of my invention is necessarily very low due to the extremely low solubility of the phosphates in aqueous choline chloride (less than 0.1 g. phosphate per kg. of aqueous choline chloride at room temperature). Consequently the amount to be used can best be defined as the amount necessary to form a choline chloride solution which is non-corrosive. In carrying out my invention, I prefer to use a saturated solution of the phosphate in aqueous choline chloride.

As has been mentioned above, the use of phosphate alone in aqueous choline chloride solutions is unsatisfactory due to the tendency of the phosphate to cause local type corrosion or pitting. However, for short periods of storage the amount of pitting which occurs is negligible and there is no noticeable effect on the color of the aqueous choline chloride solution. Therefore, when the aqueous choline chloride solution is to be used within a period of less than about 20 days after it has been put in steel drums or stored in steel tanks, then the phosphate corrosion inhibitors are sufficient in themselves to preserve the aqueous choline chloride solution color-free and the storage containers substantially uncorroded.

The amount of tartaric acid or citric acid to be used for more complete protection over extended periods of time is dependent on several factors. It has been pointed out above that besides overall corrosion, the color of the choline chloride solution must be considered as well because while my invention lowers the corrosion rate considerably, still some does take place and the iron thus going into solution must be kept colorless. In the beginning as increasing amounts of acid are added, the overall rate of corrosion is decreased and the length of time the material stays colorless is increased. However, in the case of tetraalkali metal pyrophosphates this condition is soon dissipated and while increasing amounts of the acid above desirable limits tend to increase the length of time the material remains colorless, such increases in tartaric or citric acid content increase the overall rate of corrosion. For example, as the amount of tartaric acid in the 70% aqueous choline chloride increases 0.01 g. per kg. to 0.1 g. per kg. the length of time the material remains color free when stored in a steel drum increases from 30 to 55 days and the corrosion rate decreases proportionately. However, as the amount of acid then increases to 0.5 g. per kg. of aqueous choline chloride the corrosion rate increases considerably while the length of time the material remains color free increases to over 140 days.

This inconsistency is not present when alkali metal hexametaphosphates, alkali metal phytates or alkali metal tripolyphosphates are used, and thus after a certain concentration of acid has been obtained further addition is detrimental to both the overall rate of corrosion and to the length of time the material remains color free. Considering these factors the range of amounts of acid which is operable in my invention is from 0.01 g. per kg. of choline chloride solution to 1.0 g. per kg. of choline chloride solution. For all of the phosphates included herein, I prefer to use 0.1 g. of acid per kg. of choline chloride solution.

The pH of the final solution is an important consideration of my invention and the operable range can be defined as being between 7.0 and 8.5. Care must be exercised in keeping the pH from the acid side since this increases the corrosion rate considerably. I prefer to adjust the pH of my new composition to 8.0 with an alkali metal hydroxide. The pH cannot be adjusted until after the addition of the phosphate and acid because of the appearance of a black precipitate if it is adjusted before these materials are added.

It is apparent from the description given above that alternate methods of carrying out my invention are available. For example when tartaric or citric acid is added and the pH adjusted with an alkali metal hydroxide, the fact that alkali metal tartrate or citrate will be formed is easily perceived. Thus the possibility of adding the tartrate or citrate salts as such is suggested and such a procedure is intended to be part of the invention described herein, this procedure being equivalent to that specifically described. In the event such an alternative procedure is used, it should be noted that due to the fact that alkali metal tartrates and citrates are very basic salts, it is desirable to use acid tartaric or citric salts or else the pH of the final composition is likely to be above 8.5. The amount of acid tartrate or citrate which can be satisfactorily used is within the range of about 0.01 gm. to 1.2 gms. of the acid salt per kg. of aqueous choline chloride.

A procedure wherein the phosphate is dissolved in the acid and the resulting solution subsequently added to the aqueous choline chloride is also an alternative to the specific procedure described herein. With such a procedure, the pH of the final composition must still be adjusted within the limits set forth above.

The following examples are offered to illustrate my invention. Accelerated tests were conducted wherein a steel strip was suspended in a glass receptacle containing my new choline chloride composition. The ratio of the metal surface of the steel strip to the volume of liquid present was much greater in these tests than the ratio obtained in an ordinary 55 gallon drum filled with aqueous choline chloride or in a storage tank containing choline chloride. For this reason corrosion tests carried out over a period of 6 days under the conditions enumerated below are estimated to be equivalent to corrosion tests in drums which last approximately 60 days and in tanks for much greater periods.

EXAMPLE I

A six day corrosion test was carried out wherein a carbon steel strip, 3¾ inches x 1¼ inches x 1/20 inch, was suspended in a Pyrex beaker containing approximately 100 ml. of a 70% aqueous choline chloride solution, the aqueous choline chloride being saturated with sodium hexametaphosphate and containing the amounts of tartaric acid indicated in the table. The pH was adjusted to 8.0 with sodium hydroxide. The corrosion rate is reported as the per cent of the corrosion rate obtained when a similar experiment using untreated aqueous choline chloride was carried out:

*Table I*

| Conc. Tartaric acid, g./kg. of choline chloride | Corrosion rate, percent of blank | Remarks |
|---|---|---|
| 0.01 | 33.7 | no discoloration. |
| 0.1 | 27.3 | Do. |
| 0.5 | 37.9 | Do. |

EXAMPLE II

The tests reported in the following table were conducted in the same manner as that reported in Example I except that citric acid was used instead of tartaric acid. The phosphate used is shown in the table and the amount used was that required to form a saturated solution in 70% aqueous choline chloride.

*Table II*

| Phosphate | Conc. citric acid, g./kg. of choline chloride | Corrosion rate, percent of blank | Remarks |
|---|---|---|---|
| Sodium hexa metaphosphate. | 0.1 | 25.0 | uniform corrosion. |
| Tetrasodium pyrophosphate. | 0.1 | 10.2 | no discoloration. |

EXAMPLE III

The following table shows results obtained when a test similar to that shown in Example I was carried out using sodium tripolyphosphate as the inhibitor. A saturated solution of sodium tripolyphosphate in 70% aqueous choline chloride was used.

*Table III*

| Conc. tartaric acid, g./kg. choline chloride | Corrosion rate, percent of blank | Remarks |
| --- | --- | --- |
| 0.01 | 30.3 | No discoloration. |
| 0.1 | 28.6 | Do. |
| 0.5 | 41.3 | Do. |

EXAMPLE IV

A choline chloride composition comprising a 70% aqueous choline chloride solution saturated with tetrasodium pyrophosphate, 0.5 g. tartaric acid per kg. of choline chloride solution, the pH of the composition being adjusted to 8.0 with sodium hydroxide was stored in a 55 gallon steel drum and checked daily for the appearance of discoloration. After 140 days the material was still clear.

EXAMPLE V

A choline chloride composition comprising a 70% aqueous choline chloride solution saturated with sodium hexametaphosphate, 0.01 g. tartaric acid per kg. of choline chloride solution, the pH of the composition being adjusted to 8.0 with sodium hydroxide was stored in a 55 gallon steel drum and checked daily for the appearance of discoloration. After 40 days, the inhibitor broke down as indicated by the appearance of a green turbidity.

EXAMPLE VI

A choline chloride composition comprising a 50% aqueous choline chloride solution containing the indicated amounts of tetrasodium pyrophosphate, 0.5 g. tartaric acid per kg. of choline chloride solution, the pH of the solution being adjusted to 8.0 was subjected to a six day corrosion test of the type described in Example I. The results are shown in Table IV.

*Table IV*

| Concentration of Tetrasodium pyrophosphate, g./kg. of choline chloride | Steel Strip, Weight Loss | Remarks |
| --- | --- | --- |
| 0.1 | 0.0153 | Solution clear. Strip good. No pitting. |
| 0.01 | 0.0212 | Clear. Slight Green coloration. No pitting. |
| 0.001 | 0.0200 | Do. |

EXAMPLE VII

Six day corrosion tests were carried out wherein carbon steel strips, 3¾ inches x 1¼ inches x 1/20 inch, were suspended in Pyrex beakers containing approximately 100 ml. of a 70% aqueous choline chloride solution, the aqueous choline chloride being saturated with the phosphates indicated in Table V. The pH was adjusted to 8.0 with sodium hydroxide. The corrosion rate was measured as in Example I and the results are shown in Table V.

*Table V*

| Phosphate | Corrosion rate, percent of blank | Remarks |
| --- | --- | --- |
| Sodium Hexametaphosphate. | 40.0 | Slight local attack. |
| Tetrasodium Pyrophosphate. | 30.5 | Pitted. Slight gelatinous precipitate on strip. |

This application is a continuation-in-part of my application Serial No. 173,683 filed July 13, 1950 now United States Patent 2,576,644.

It is to be understood that the scope of my invention is not to be limited by the amounts and materials indicated in the foregoing examples. Variations in procedure, materials, and proportions which are obvious to anyone skilled in the art are to be considered as within the scope of the invention as it is described in this specification and the attached claims.

Now having disclosed my invention what I claim is:

1. A non-corrosive choline chloride composition consisting of aqueous choline chloride solution of a concentration of at least 50% choline chloride, and an inhibitor selected from the group consisting of tetraalkali metal pyrophosphates, alkali metal phytates, alkali metal hexametaphosphates, and alkali metal tripolyphosphates, the pH of said composition being adjusted to between 7.0 and 8.5.

2. A non-corrosive choline chloride composition consisting of aqueous choline chloride solution of a concentration of at least 50% choline chloride, and an inhibitor selected from the group consisting of tetraalkali metal pyrophosphates, alkali metal phytates, alkali metal hexametaphosphates, and alkali metal tripolyphosphates, the pH of said composition being adjusted to from 7.0 to 8.5 with an alkali metal hydroxide.

3. A non-corrosive choline chloride composition consisting of aqueous choline chloride solution of a concentration of at least 50% choline chloride, saturated with a compound selected from the group consisting of tetraalkali metal pyrophosphates, alkali metal hexametaphosphates, alkali metal tripolyphosphates, and alkali metal phytates, the pH of said composition being adjusted to from 7.0 to 8.5.

4. A non-corrosive choline chloride composition consisting of aqueous choline chloride solution of a concentration of at least 50% choline chloride, saturated with a compound selected from the group consisting of tetraalkali metal pyrophosphates, alkali metal hexametaphosphates, alkali metal tripolyphosphates, and alkali metal phytates, the pH of said composition being adjusted to 8.0.

5. A non-corrosive choline chloride composition consisting of aqueous choline chloride solution of a concentration of at least about 50% choline chloride, saturated with tetrasodium pyrophosphate, the pH of said composition being adjusted to 8.0.

6. A non-corrosive choline chloride composition consisting of aqueous choline chloride solution of a concentration of at least about 50% choline chloride, saturated with sodium hexametaphosphate, the pH of said composition being adjusted to 8.0.

7. A non-corrosive choline chloride composition consisting of aqueous choline chloride solution of a concentration of at least about 50% choline chloride, saturated with sodium tripolyphosphate, the pH of said composition being adjusted to 8.0.

FRED W. SCHMITZ.

References Cited in the file of this patent

UNITED STATES PATENTS

| Number | Name | Date |
| --- | --- | --- |
| 2,457,226 | Gresham | Dec. 28, 1948 |
| 2,576,644 | Schmitz | Nov. 27, 1951 |